Oct. 21, 1969   D. S. BARTLETT, JR   3,473,658
APPARATUS FOR SEPARATING FRUIT FROM DIRT CLODS AND DEBRIS
Filed Sept. 25, 1967   3 Sheets-Sheet 1
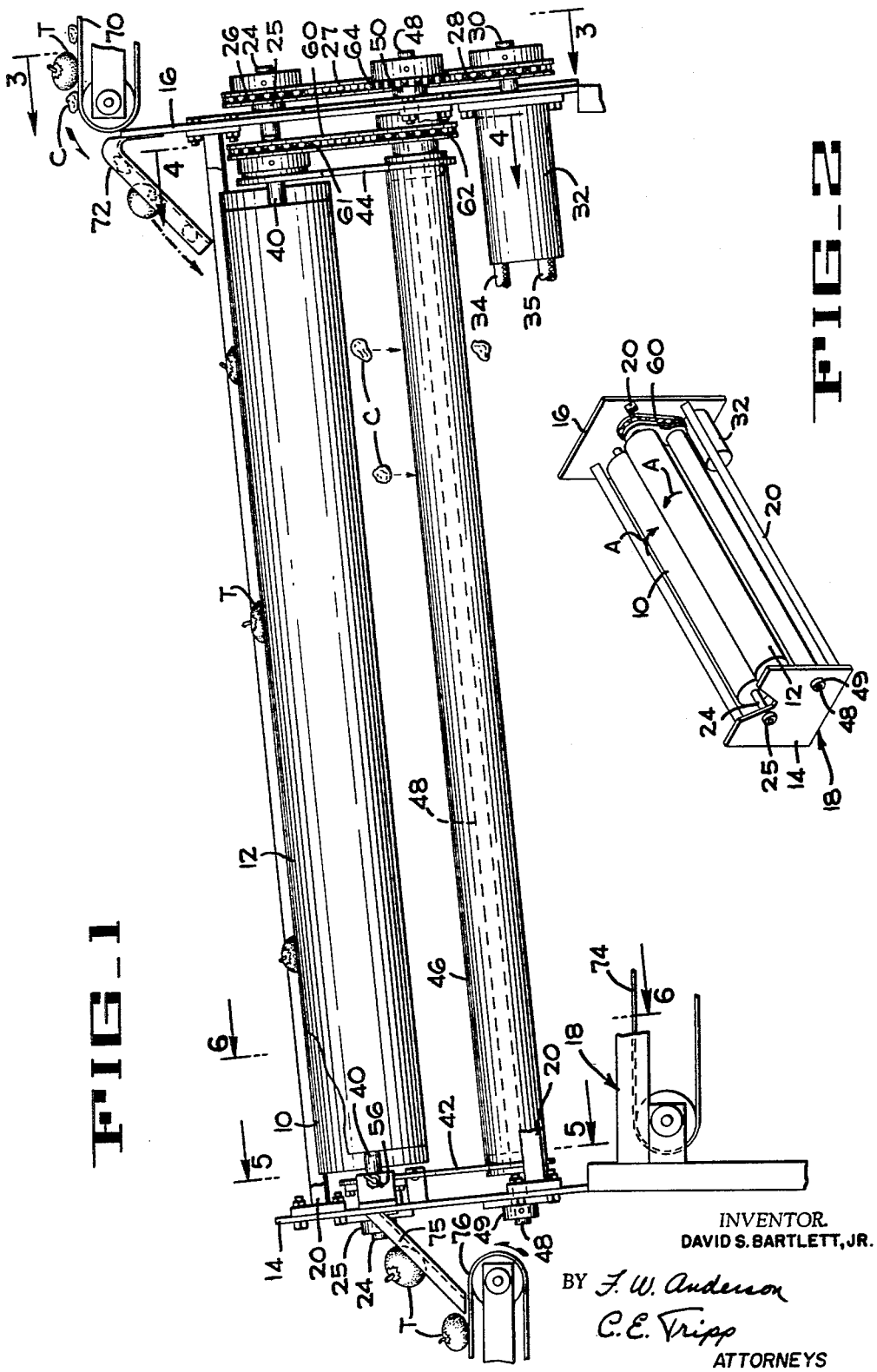
INVENTOR.
DAVID S. BARTLETT, JR.
BY F. W. Anderson
C. E. Tripp
ATTORNEYS

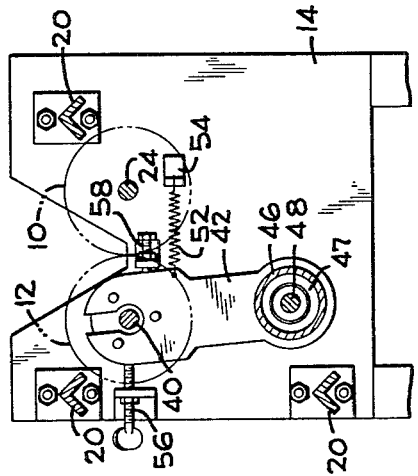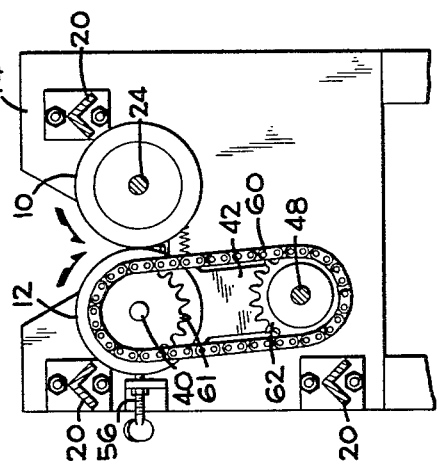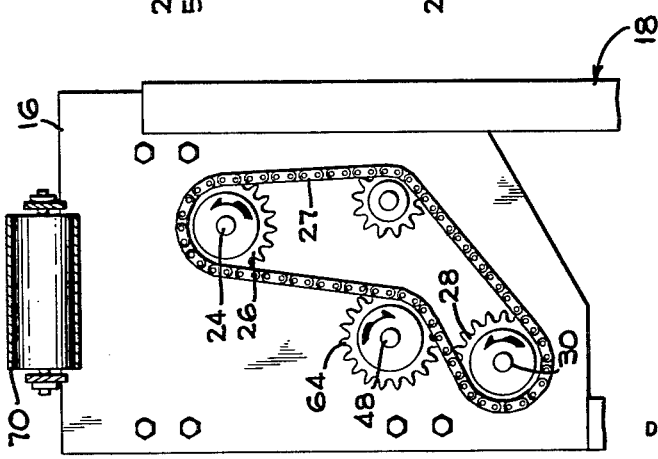

Oct. 21, 1969  D. S. BARTLETT, JR  3,473,658
APPARATUS FOR SEPARATING FRUIT FROM DIRT CLODS AND DEBRIS
Filed Sept. 25, 1967  3 Sheets-Sheet 3
FIG_6
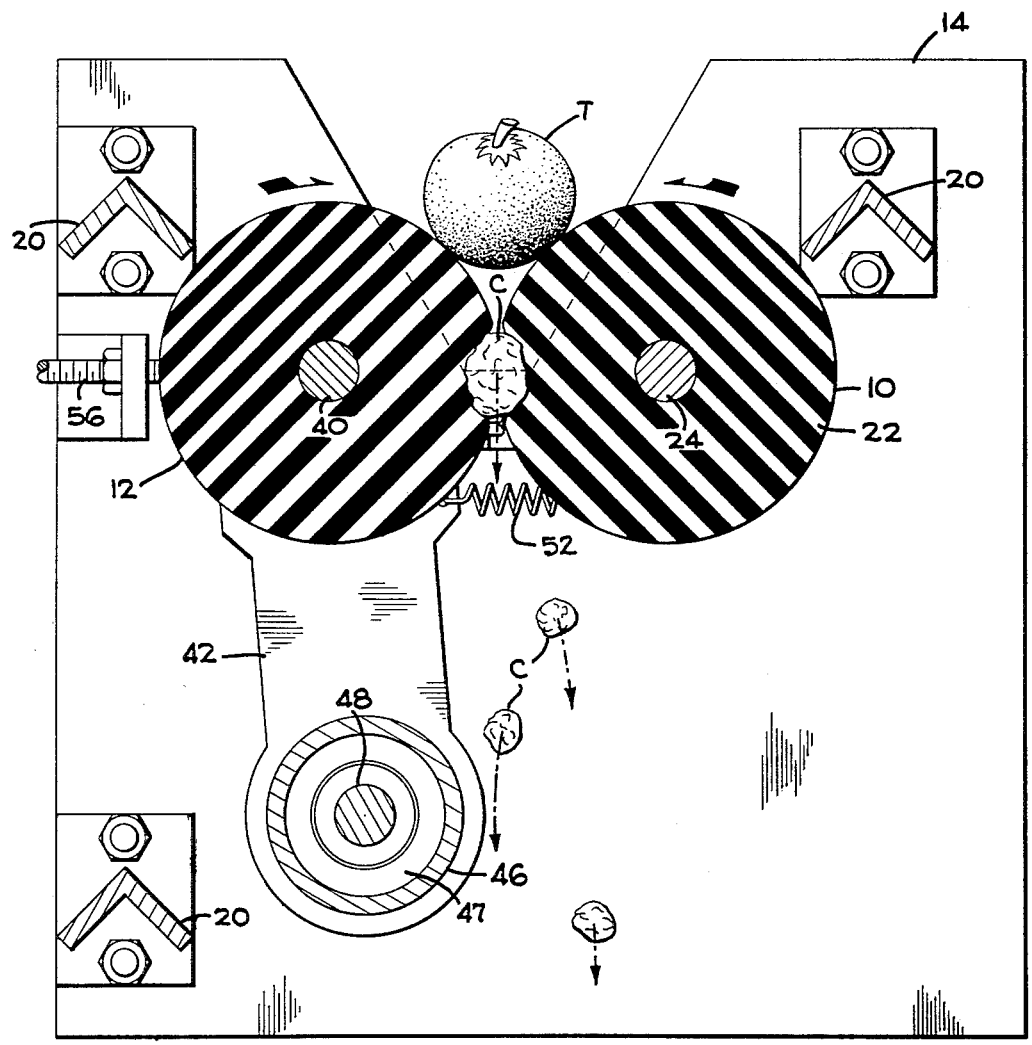
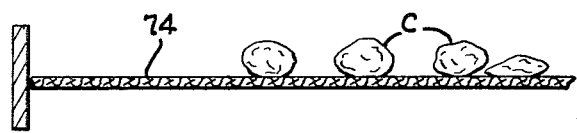
INVENTOR.
DAVID S. BARTLETT, JR.
BY F.W. Anderson
C.E. Tripp
ATTORNEYS United States Patent Office 3,473,658
Patented Oct. 21, 1969

3,473,658
APPARATUS FOR SEPARATING FRUIT FROM
DIRT CLODS AND DEBRIS
David S. Bartlett, Jr., San Jose, Calif., assignor to FMC
Corporation, San Jose, Calif., a corporation of Delaware
Filed Sept. 25, 1967, Ser. No. 670,204
Int. Cl. B07c 5/04, 1/10; B07b 13/04
U.S. Cl. 209—108                                          3 Claims

ABSTRACT OF THE DISCLOSURE

A pair of juxtaposed, parallel, soft rollers which rotate in opposite directions define a downwardly inclined channel along into which a mass of material, including loose dirt, dirt clods, and smooth-surfaced articles such as tomatoes, are deposited. Due to the fact that the rollers effectively grip the dirt but not the relatively smooth articles, the articles move downwardly along the top of the channel toward the lower end of the channel while the dirt and dirt clods are drawn downwardly between the rollers.

BACKGROUND OF THE INVENTION

This invention relates to apparatus for separating fruit from dirt with which it may be associated as in a harvesting operation. More specifically, it relates to apparatus for separting dirt and dirt clods from vine crops such as tomatoes which are harvested by cutting or digging the vines from the ground with a harvesting action that results in an accumulation of fruit, loose dirt, dirt clods and other debris.

In many instances, debris, such as dirt and dirt clods, is separated from the harvested fruit by allowing it to drop through openings in a chain conveyor on which the vines are advanced through the harvester or by depositing the mass on a belt or table and separating the fruit from the debris by a manual separating action.

SUMMARY OF THE INVENTION

This invention involves a method and apparatus for separating irregular articles such as dirt clods and the like from articles such as tomatoes, that have relatively smooth surfaces, by depositing the mass on a pair of parallel, elongated, side-by-side rollers which are mounted in a slightly inclined position so that the valley provided between the upper surfaces of the rollers defines an inclined channel which receives the mass of material. The surfaces of the rollers are made of relatively soft material such as sponge rubber and the rollers are rotated in opposite directions so that their upper surfaces move inwardly toward each other and then downwardly. The dirt is separated from the tomatoes due to difference in surface characteristics of dirt clods and tomatoes. The tomatoes have rounded, smooth surfaces while the dirt clods have irregularly shaped, rough surfaces. Accordingly, the dirt clods will be grasped and drawn downwardly by the relatively soft rollers and pass through the interface of the rollers, while the smooth-skinned tomatoes will slide or roll under the influence of gravity along the inclined channel to the lower ends of the rollers for discharge in spaced relation to the dirt clods.

It is therefore an object of the invention to provide an apparatus for sorting articles having relatively smooth curved surfaces, such as the surfaces of tomatoes, from objects that have irregular surfaces, such as the surfaces of dirt clods.

DESCRIPTION OF THE DRAWINGS

FIGURE 1 is a side elevation of a separating apparatus constructed according to the teaching of the present invention.

FIGURE 2 is a schematic perspective of the apparatus of FIG. 1.

FIGURE 3 is a vertical section taken along line 3—3 of FIG. 1.

FIGURE 4 is vertical section taken along line 4—4 of FIG. 1.

FIGURE 5 is a vertical section taken along line 5—5 of FIG. 1.

FIGURE 6 is a vertical section taken along line 6—6 of FIG. 1.

DESCRIPTION OF THE PREFERRED EMBODIMENT

In FIGURES 1 and 2 an embodiment of the invention is disclosed which comprises a pair of rollers 10 and 12 rotatably mounted in generally parallel inclined position between two spaced end plates 14 and 16 of a rigid support structure 18 which includes a plurality of angle bars 20 rigidly interconnecting the end plates. The roller 10 (FIG. 6) consists of a rubber sleeve 22 bonded to a metal shaft 24 which is journalled at each end in a bearing 25 mounted on one of the end plates. The portion of shaft 24 extending through end plate 16 has a sprocket 26 (FIG. 1) secured thereto, and said sprocket is driven by means of a chain 27 that is trained around a sprocket 28 which is secured to the drive shaft 30 of an hydraulic motor 32. The motor 32 is bolted to the inner face of end plate 16 and is provided with the conventional hydraulic conduits 34 and 35.

The roller 12 is substantially identical in construction to roller 10, however, instead of being journalled in the end plates 14 and 16, the center shaft 40 of roller 12 is rotatably journalled in the upper ends of two spaced support levers 42 and 44. Lever 42 is adjacent the end plate 14, and lever 44 is adjacent end plate 16, and both levers are welded at their lower ends to a tube 46 which is provided with an anti-friction bearing 47 (FIG. 6) at each end to rotatably support a shaft 48 extending through the tube. The shaft 48 is also rotatably journalled adjacent its ends in bearings 49 and 50 which are mounted in the end plates 14 and 16 respectively. A spring 52 (FIG. 5), which is connected between the lever 42 and an anchor member 54 secured to end plate 14, urges the roller 12 toward the roller 10. A pair of stop screws 56 and 58 are arranged to be moved into abutting engagement with the lever 42 to lock the roller 12 in a selected position relative to roller 10 if it is desired to operate the separator with the distance between the rollers 10 and 12 being maintained constant. Alternatively, the stop screws 56 can be backed off so that the position of the roller is under the control of the spring. A third arrangement is one in which the inner set screw 58 is set to limit the inward movement of the roller 12 to maintain a desired minimum clearance between the rollers.

The roller 12 is driven by a chain 60 (FIG. 1) that is trained around a sprocket 61 secured to shaft 40 and around a sprocket 62 secured to shaft 48 that passes through tube 46. As seen in FIG. 3, the chain 27 which is driven by the motor 32 is disposed in driving engagement with a sprocket 64 that is secured to shaft 48. Accordingly, when the motor drives the roller 10 counterclockwise (FIG. 4), it drives the roller 12 clockwise.

In operation, while the rollers 10 and 12 are rotating in the direction indicated by the arrows A in FIG. 2, a mixture of fruit such as tomatoes T, loose dirt, dirt clinging to the fruit, and dirt clods is delivered by a conveyor 70 to a chute 72 which directs the material into the upper end of the channel defined between the rollers 10 and 12. As the material starts down the channel, dirt will be shaken loose from the tomatoes and will pass down between the rollers along with the loose dirt. Dirt clods C will be gripped by the inwardly and downwardly moving surfaces of the rollers 10 and 12 and will be drawn through the space between the rollers and discharged on a conventional belt conveyor 74. The tomatoes T, due to their relatively smooth rounded surfaces, will not be gripped by the rollers and will progress down the inclined channel and discharged onto a chute 75 (FIG. 1) leading to a belt conveyor 76.

The rollers must be of a material, such as sponge rubber, that compresses easily so that it will grip irregular objects and accelerate them downwardly. Further the compression must take place locally so that fruit will not be lost at other points along the roller interface. Also, the roller material should be resilient so that it can quickly resume its natural shape after the passage of a dirt clod. Dirt clods were separated from tomatoes according to the concepts of the present invention in a machine which included two rollers having diameters of about 5.5 inches, the shaft 24 being about 1.5 inches in diameter and the sleeve 22 being about 2 inches thick. The sleeve, which was bonded by an adhesive to the shaft so that it rotated therewith, was made of a nitrile-rubber vinyl sold under the trademark Armaflex #22 marketed by Armstrong Cork Co. of Lancaster, Pa. This material had a density of from 5 to 6 pounds per cubic foot, and was compressed about 25% under a load of about 250 pounds per 50 square inches.

To prevent abrasion of the surface of the rollers by the dirt and other material, a coating of a material, such as a neoprene sheet having a 30–35 durometer hardness, may be placed over the surface of the roller, and bonded thereto.

An efficient separating action takes place when rollers constructed according to the present invention are inclined about 10 degrees from the horizontal and rotated at about 200 r.p.m.

Having thus described my invention, what I claim as new and desire to protect by Letters Patent is:

1. Apparatus for sorting out clods of dirt from smooth articles such as tomatoes and similar fruit comprising a pair of parallel, contra-rotating rolls in engagement to form an article receiving channel having smooth, downwardly moving surfaces, the exterior portions of said rolls being formed of rubber; the improvement wherein said roll rubber includes a layer of soft sponge rubber which has both a thickness and a radius in the order of the diameter of the fruit for causing the fruit to ride relatively high in the roll channel without being caught between these rolls, said sponge rubber being soft and thick enough to engulf and eject the clods by deforming locally about the clods without opening up fruit grasping pockets adjacent the clods.

2. The apparatus of claim 1, wherein said sponge rubber has a density of about 5 to 6 pounds per cubic foot.

3. The apparatus of claim 1, wherein said sponge rubber is soft enough to be deformed inwardly about 25% of its thickness under a load of approximately 5 p.s.i.

References Cited
UNITED STATES PATENTS

| | | | |
|---|---|---|---|
| 844,049 | 2/1907 | Schumacher | 209—108 |
| 1,148,589 | 8/1915 | Johnson | 209—108 |
| 1,240,693 | 9/1917 | Ferrell | 209—108 |
| 1,723,492 | 8/1929 | Ryder | 209—108 |
| 1,723,539 | 8/1929 | Bussard | 209—108 |

ALLEN N. KNOWLES, Primary Examiner